United States Patent [19]

Matsumoto

[11] Patent Number: 5,234,643
[45] Date of Patent: Aug. 10, 1993

[54] SILICON NITRIDE CERAMICS CONTAINING CRYSTALLIZED GRAIN BOUNDARY PHASES

[76] Inventor: Roger L. K. Matsumoto, 2 Ranch Ct., Paper Mill Farms, Newark, Del. 19711

[21] Appl. No.: 828,541

[22] Filed: Jan. 27, 1992

[51] Int. Cl.$^5$ .............................. C04B 35/58
[52] U.S. Cl. ..................... 264/65; 264/101; 264/102; 501/96; 501/97
[58] Field of Search ............ 264/65, 101, 102; 501/96, 97

[56] References Cited

U.S. PATENT DOCUMENTS

| | | |
|---|---|---|
| 4,113,830 | 9/1978 | Mazdiyasni ........................ 264/101 |
| 4,264,550 | 4/1981 | Ezis ........................................ 264/85 |
| 4,376,742 | 3/1983 | Mah ...................................... 264/101 |
| 4,407,971 | 10/1983 | Komatsu et al. ..................... 501/97 |
| 4,612,296 | 9/1986 | Sakamoto et al. ................... 501/93 |
| 4,983,554 | 1/1991 | Hsieh ..................................... 501/97 |
| 5,023,214 | 6/1991 | Matsumoto et al. ................. 501/97 |
| 5,094,986 | 3/1992 | Matsumoto et al. ................. 501/97 |

*Primary Examiner*—James Derrington

[57] ABSTRACT

A silicon nitride ceramic having crystalline grain boundary phases is prepared by heating a composition comprising silicon nitride, a silicate glass-forming sintering aid and a high metal content transition metal silicide, to a temperature of 1300° to 1800° C. under vacuum until a glass forms, oxygen is removed from the glass, and the glass crystallizes. Alternatively, the grain boundaries of a sintered composition comprising silicon nitride, a silicate glass and a high metal content transition metal silicide can be crystallized by heating to at least 1300° C. under a vacuum.

14 Claims, No Drawings

SILICON NITRIDE CERAMICS CONTAINING CRYSTALLIZED GRAIN BOUNDARY PHASES

FIELD OF THE INVENTION

This invention relates to a method for producing silicon nitride ceramics.

BACKGROUND OF THE INVENTION

The use of silicon nitride ceramics in a number of high temperature structural applications has been proposed. The advantages of this material in such applications include its higher relative flexural strength and fracture toughness at elevated temperatures. Unfortunately, since silicon nitride is a mostly covalently bonded ceramic, it is difficult to densify fully in its pure state. Additives are necessary to promote a glassy grain boundary phase that aids in densification. It is the presence of the glassy silicate phase that limits the performance of silicon nitride at high temperatures. This glassy phase softens and melts with catastrophic effects on the mechanical properties of the ceramic.

One method for eliminating this glassy phase is described in U.S. Pat. No. 4,264,550, where a mixture of silicon nitride powder containing $SiO_2$ as an oxide surface coating and $Y_2O_3$ powder is heated to 1000° to 1400° C. under a pressure of at least 2000 psi to permit a nucleating reaction to take place. The mixture is then heated to a temperature of 1680° to 1750° C. under pressure. The resulting pressed body is claimed to contain fully crystallized grain boundary phases of $Si_3N_4 \cdot SiO_2 \cdot Y_2O_3$.

Various silicon nitride compositions containing metal silicides have been disclosed. For example, U.S. Pat. No. 4,407,971, discloses a sintered ceramic body comprising yttrium oxide, aluminum oxide, aluminum nitride and 0.1 to 5% by weight of at least one silicide of Mg, Ca, Ti, V, Cr, Mn, Zr, Nb, Mo, Ta and W. U.S. Pat. No. 4,612,296 discloses a high toughness silicon nitride sintered body containing at least one silicide or carbide of Ti, Zr, Hf, V, Nb, Ta, Cr, Mo and W. U.S. Pat. No. 4,983,554 discloses a sintered silicon nitride ceramic containing aluminum nitride, yttrium oxide, and molybdenum disilicide. U.S. Pat. No. 5,023,214 discloses a sintered $Si_3N_4$ product containing a sintering aid and 1 to 80% of a silicide of Fe, Ni or Co. U.S. Pat. No. 5,094,986 (Matsumoto and Rosenthal), discloses a process for preparing a sintered silicon nitride ceramic containing 2% to 6% of a silicide of Fe, Ni or Co, at least 50% of which is a high metal content silicide. None of these references discloses a method for eliminating the glassy silicate phase in the silicon nitride ceramic by deoxygenating the sintered ceramic in a vacuum.

SUMMARY OF THE INVENTION

The process of this invention for preparing a silicon nitride ceramic having crystalline grain boundary phases comprises heating a composition comprising (1) from about 20% to about 98% silicon nitride, (2) from 0.5% to about 20% of a silicate glass forming sintering aid and (3) from 0.001% to about 80% of a high metal content transition metal silicide, all percentages being by weight based on the total weight of the composition, under vacuum at a temperature of 1300° to 1800° C. until a silicate glass phase forms, oxygen is removed from the glass, and the glass crystallizes.

Also according to the invention, a sintered composition comprising (1) from about 20% to about 98% silicon nitride, (2) from 0.5% to about 20% of a silicate glass, and (3) from 0.001% to about 80% of a high metal content silicide, all percentages being by weight based on the total weight of the composition, is heated to a temperature of at least 1300° C. under vacuum until oxygen is removed from the glass and the glass crystallizes.

DETAILED DESCRIPTION OF THE INVENTION

When a vacuum is applied concurrently with sintering, the starting composition comprises (1) from about 20% to about 98% silicon nitride, (2) from 0.5% to about 20% of a silicate glass forming sintering aid, and (3) from 0.001% to about 80% of a high metal content transition metal silicide, all percentages being by weight based on the total weight of the composition.

The silicon nitride used can be any commercially available silicon nitride powder. The silicon nitride is used in an amount of from about 20% to about 98%, based on the total weight of the composition.

The starting composition also includes from 0.5% to about 20%, based on the total weight of the composition, of a silicate glass-forming sintering aid. The amount of sintering aid used must be sufficient to densify the ceramic to the degree desired and also depends upon which silicide is used and how much is used. The amount of sintering aid required can readily be determined by one skilled in the art. The sintering aid is selected from the group consisting of oxides, nitrides or silicates of elements of IUPAC groups 2, 3, 4, 13 or the lanthanide series, or mixtures thereof. A combination of aluminum oxide and yttrium oxide is preferred. The silicate sintering aid can be added as a powder or can be formed in situ by the reaction of an oxide or nitride sintering aid with the silica that is inherently present on the surface of the silicon nitride powder. When a nitride sintering aid is used, it is sometimes desirable to add silica in addition to that which is inherently present on the surface of the silicon nitride.

The transition metal silicides suitable for use in the processes of this invention include yttrium and the rare earths (lanthanum and the lanthanides), titanium, zirconium, hafnium, manganese, rhenium, vanadium, niobium, tantalum, chromium, molybdenum, tungsten, iron, ruthenium, osmium, cobalt, rhodium, iridium, nickel, palladium, platinum and copper. Some of these metals form high temperature-stable nitrides or carbides as well as silicides, which can diminish the effectiveness of these metal silicides in the practice of the invention. The preferred transition metals are therefore iron, ruthenium, osmium, cobalt, rhodium, iridium, nickel, palladium and platinum. Cobalt, rhodium and iridium are most preferred.

The high metal content transition metal silicides can be formed in situ by reaction of the metal or its oxide, chloride, nitrate or other compound with the silicon nitride during sintering, or they can be added as preformed particulates. High metal content silicides are defined as those in which the ratio of metal to silicon is equal to or greater than 1. It is normally not possible to form the high metal content silicides from low metal content silicides. For example, $CoSi_2$ added to silicon nitride does not result in the formation of the desired high metal content $Co_2Si$ phase. Low metal content silicides are not suitable for use in the process of this invention because of their oxidation behavior in the presence of Si—O bonds (see for example, G. R. Castro, J. E. Hulse and J. Küppers, *Applied Surface Science*, 27 (1986) 262-274).

The amount of silicide present in the silicon nitride ceramic is from 0.001% to about 80%, based on the total weight of the composition. If a glass-free ceramic comprising an extremely high percentage of silicon nitride is desired, e.g., 90-98 wt. % $Si_3N_4$, catalytic amounts of the silicide are used, i.e., less than 1% by weight. If microcomposites of metal silicide particles dispersed in a silicon nitride matrix are desired, large amounts of metal silicide can be used.

Small amounts (less than 1.0 wt. %) of the transition metal silicide can be used if the silicide phase is present as very small, well dispersed particles. When larger silicide particles are used, or if the silicide particles are not well dispersed, the identical composition will require substantially higher quantities of silicide to produce the same results.

The composition can additionally contain other ceramic or metal phases that do not interfere with the catalytic effect of the high metal content silicide upon the glassy grain boundary phases. Such additives include, for example, titanium carbide, titanium nitride and zirconium oxide.

In a typical process, silicon nitride powders are milled along with the silicate-forming sintering aid. When metal, metal silicide or insoluble metal compound powders are used, they are milled with the silicon nitride powder before milling with the sintering aid. When soluble metal salts are used, they are added directly to an aqueous slurry of silicon nitride and sintering aid. Milling can be performed with any conventional equipment, such as, for example, ball mills, vibratory mills and attrition mills.

After milling, the slurry can be used for slip casting or any other liquid forming process. Alternatively, the slurry can be dried, for example, by spray drying. The resulting powders can be formed into shapes by any powder-forming technique including, for example, dry pressing (uniaxial or isostatic), tape casting, injection molding, and extrusion. The powder mixture may or may not contain a binder, depending upon the forming technique selected.

Shaped articles made from the compositions described above are densified by sintering. Suitable sintering techniques include, for example, hot pressing, hot isostatic pressing or pressureless sintering. A nitrogen atmosphere can be used during sintering and subsequent densification. Both sintering and densification are typically carried out at 1300° to 1800° C. in a continuous, one step heating process. The part can also be sintered without full densification, depending upon its intended use. Sintering under a vacuum, with or without full densification, will result in deoxygenation and crystallization of the glassy silicate grain boundary phase catalyzed by the high metal content silicide. The process is accompanied by the evolution of silicon monoxide (SiO), which is a gas above 1300° C. at the processing pressures used. Vacuum is defined as any pressure lower than atmospheric. The extent of deoxygenation can be controlled by the temperature and time at temperature, as well as by the level of vacuum applied. The vacuum environment serves three purposes: (1) it eliminates residual oxygen activity in the process atmosphere, (2) it promotes the formation of SiO in the composition, rather than $SiO_2$, and (3) it rapidly removes the gaseous SiO from the ceramic as it is evolved.

Alternatively, the shaped article can be sintered as described above, with or without full densification, without application of a vacuum. The sintered ceramic comprises (1) from about 20% to about 98% silicon nitride, (2) from 0.5% to about 20% of a silicate glass, and (3) from 0.001% to about 80% of a high metal content silicide, all percentages being by weight based on the total weight of the composition. Heating of the sintered ceramic under vacuum at a temperature above 1300° C. will then produce deoxygenation and crystallization of the silicate glass.

It is believed that the metal silicide is oxidized to form free metal and gaseous SiO when a vacuum is applied to the sintered ceramic at a temperature above 1300° C. The free metal subsequently reacts with additional silicon nitride in the composition to reform the high metal content silicide with concurrent release of nitrogen gas as the reaction by product. These reactions continue until enough of the reactive oxygen in the silicate glass phase is removed as SiO so that the silicate phase crystallizes. The result is thus a silicon nitride ceramic that can be completely devoid of glassy silicate phases. However, full depletion of reactive oxygen from the ceramic is possible only if no additional oxygen is available to the ceramic during processing. For example, if oxygen gas is present as a trace impurity in an inert process gas, reactive oxygen will remain in the ceramic. A level of even one part per billion oxygen impurity is a substantial quantity when there is a continuous gas flow during processing.

Unless otherwise noted, the following procedure was used for all of the examples. All powders were milled in a small 5-chamber vibratory mill (SWECO M-18-5) in water with silicon nitride milling media for 16 hours. The slurry was dried using a laboratory spray drier. The powders were hot pressed in graphite dies at 4000 psi. Approximately 50 grams of powder were used to form a 2 inch diameter disc about 0.25 inch thick. Bulk densities were obtained either geometrically or by the Archimedes principle. Fractured surfaces were coated with a thin (~2-5 nm) sputtered layer of gold/palladium. The surfaces were then analyzed in a scanning electron microscope (SEM) (Hitachi S-4000) at magnifications up to 300,000 X. Crystallographic content was determined by X-ray diffraction.

In this specification, all percentages are by weight, based on the total weight of the composition, unless otherwise noted.

COMPARATIVE EXAMPLE A

In this example, the silicon nitride composition was hot pressed under vacuum, but no metal silicide was present.

91% Alpha-silicon nitride, 3% aluminum oxide, and 6% yttrium oxide powders were milled and spray dried. The powders were hot pressed in graphite dies to 1750° C. for 4 hours with 4000 psi pressure under a vacuum. The material completely densified yielding a bulk density of 3.10 g/cc. No SiO evolution was observed and the material contained a substantial amount of intergranular glassy silicate phase.

COMPARATIVE EXAMPLE B

In this example, the silicon nitride composition contained a metal silicide, but a vacuum was not used during hot pressing.

The composition of Example A was mixed with 12% by weight of cobalt and hot pressed under the same conditions as Example A except that nitrogen was used instead of a vacuum. The material had a bulk density of 3.4 g/cc and $Co_2Si$ and $CoSi$ were present. No SiO evolution was observed and large amounts of glassy silicate phase were observed by SEM.

COMPARATIVE EXAMPLE C

The composition of Example A was modified by adding 10% by weight of powdered $CoSi_2$. The mixture was hot pressed under the vacuum conditions of Example A. The resulting bulk density was 3.4 g/cc. No SiO evolution was observed and substantial quantities of glass were observed as in Example B. This example demonstrates that only high metal content silicides are effective in catalyzing oxygen removal and thereby promoting the crystallization of the grain boundary phase.

EXAMPLE 1

The composition of Example A was prepared with an added 12% by weight of cobalt metal. The mixture was hot pressed under the same vacuum conditions as Example A. Cobalt reacted with silicon nitride during densification to form the silicides $CoSi$ and $Co_2Si$ having a volume percentage of 13%. SiO evolution was observed. The material after vacuum hot pressing resulted in a bulk density of 3.4 g/cc. Analysis by SEM indicated that there was no glassy silicate phase remaining. Only crystalline grains and the silicide phases were found.

EXAMPLE 2

The material of Example 1 was hot pressed at 1750° C. for 6 hours at 4000 psi pressure under nitrogen followed by 1600° C. for 24 hours at 4000 psi pressure under vacuum. SiO evolution was observed. The resulting material had a bulk density of 3.56 g/cc. Under SEM to 300,000 X, there was no evidence of a glassy silicate phase. Microdiffraction in a transmission electron microscope of the grain boundary phase showed that the phase was entirely crystalline: no amorphous halo was detected. The silicon nitride phase was seen to coexist with this crystalline phase, which is shown to consist of Si, Y, Al, and minor amounts of Co by EDS (energy dispersive spectroscopy). Z contrast imaging in a scanning transmission electron microscope (STEM) confirmed that the Y and Co were confined to this intergranular phase. X-ray diffraction analysis of this material showed the presence of peaks that were not present in patterns obtained from the samples of Example B. These peaks are assignable to $Y_2Si_2O_7$. The analysis also revealed the presence of very small quantities of $Y_{10}Al_2Si_3O_{18}N_4$.

High resolution TEM analysis confirmed the crystallization of the glass via lattice fringes. Simultaneous lattice fringes were obtained on the silicon nitride and yttrium silicate phases. Only crystalline phases can have lattice fringing. There remained only a thin band of amorphous material between the grains having a thickness ≤0.1 nm. The spacings of the fringes corresponded to $Si_3N_4$ and to $Y_2Si_2O_7$. There were also areas in which the thickness of the amorphous band approached zero, indicating that the crystallization had gone to completion.

EXAMPLE 3

Rhodium chloride was added to Composition A. The composition contained 0.5% rhodium silicide after hot pressing. The slurry was dried using a rotary evaporator, and the dried, agglomerated powders were deagglomerated using a paint shaker. The powders were screened through an 80 mesh sieve and then hot pressed first under nitrogen and then under vacuum as in Example 2, except that the hold time at 1750° C. was 4 hours instead of 6 hours. SiO evolution was observed. The material had a density of 2.69 g/cc (full density is 3.2 g/cc) and contained no glassy silicate phase (SEM to 300,000 X). The rhodium silicide was well distributed as 100-200 nm particles.

EXAMPLE 4

Sections from a dense glass containing ceramic that was prepared using the same composition and processing profile as Example B were reheated to 1300° C. for 48 hours under vacuum without applied mechanical pressure. The sections exhibited a weight loss of 7.8% and had an average density of 3.5 g/cc after reheating. SiO evolution was observed. There was a shiny, thin skin on the reheated sections, which presumably was elemental silicon.

A fracture surface was examined by SEM and found not to contain any glassy intergranular phases. The material appeared to be composed entirely of crystalline phases. This example demonstrates that crystallization of the glass by deoxygenation can be accomplished on an already fully densified ceramic.

EXAMPLE 5

A composition containing 5% cobalt, 90.25% silicon nitride, 3.8% yttria, and 0.95% alumina (all percentages by weight) were milled and spray dried. The powders were hot pressed under the conditions of Example 2 except that the time at 1750° C. was 2 hours instead of 6 hours. SiO evolution was observed. The sintered material had a bulk density of 3.30 g/cm$^3$ and contained $Co_2Si$ and $CoSi$. Examination of a fractured sintered surface by SEM showed no evidence of a glassy phase.

EXAMPLE 6

A composition containing 95 g silicon nitride, 4 g yttria, 1 g alumina and 1 g iridium chloride trihydrate was milled with water and dried using a rotary evaporator. The dried powders were crushed and sieved through an 80 mesh screen. The powders were then hot pressed under vacuum as in Example 5. SiO evolution was observed. The dense, sintered material had a bulk density of 3.25 g/cm$^3$. Examination of a fractured surface by SEM showed no evidence of glass. The crystallized grain boundary was very easily identified. The iridium silicide particles were characterized by back-scattered electrons, and were seen to be very uniformly dispersed at all grain junctions. All of the iridium silicide particles appeared to be under 0.1 μm in diameter.

I claim:

1. A process for preparing a sintered silicon nitride ceramic having crystalline grain boundary phases comprising heating a composition comprising (1) from about 20% to about 98% silicon nitride, (2) from 0.5% to about 20% of a silicate glass forming sintering aid, and (3) from 0.001% to about 80% of a high metal content transition metal silicide, all percentages being by weight based on the total weight of the composition, to a temperature of 1300° to 1800° C. under vacuum until a silicate glass forms, oxygen is removed from the silicate glass as SiO gas, and the glass crystallizes.

2. The process of claim 1 wherein the metal silicide is present in an amount of 0.001% to 1%.

3. The process of claim 1 wherein the metal silicide is present in an amount of 0.001% to about 40%.

4. The process of claim 1 wherein the sintering aid is a combination of aluminum oxide and yttrium oxide.

5. The process of claim 1 wherein the high metal content silicide is a silicide of Fe, Ru, Os, Co, Rh, Ir, Ni, Pd or Pt.

6. The process of claim 5 wherein the high metal content silicide is a silicide of Co, Rh or Ir.

7. The process of claim 1 which additionally comprises densifying the composition while heating under a vacuum.

8. A process for crystallizing the grain boundaries of a silicate glass containing silicon nitride ceramic comprising heating a sintered composition comprising (1) from about 20% to about 98% silicon nitride, (2) from 0.5% to about 20% of a silicate glass, and (3) 0.001% to about 80% of a high metal content transition metal silicide, all percentages being by weight based on the total weight of the composition, to a temperature of at least 1300° C. under vacuum until oxygen is removed from the silicate glass as SiO gas and the glass crystallizes.

9. The process of claim 8 wherein the metal silicide is present in an amount of 0.001% to 1%.

10. The process of claim 8 wherein the metal silicide is present in an amount of 0.001% to about 40%.

11. The process of claim 8 wherein the silicate glass is an aluminum- and yttrium-containing glass.

12. The process of claim 8 wherein the transition metal silicide is a high metal content silicide of Fe, Ru, Os, Co, Rh, Ir, Ni, Pd or Pt.

13. The process of claim 12 wherein the transition metal silicide is a high metal content silicide of Co, Rh or Ir.

14. The process of claim 8 which additionally comprises densifying the sintered ceramic in a non-oxidizing atmosphere at a temperature of 1300° to 1800° C. before applying the vacuum.

* * * * *